United States Patent [19]

Hirano

[11] Patent Number: 5,247,567
[45] Date of Patent: Sep. 21, 1993

[54] PORTABLE-TO-PORTABLE TALK SYSTEM FOR CORDLESS TELEPHONE

[75] Inventor: Masahiro Hirano, Saitama, Japan

[73] Assignees: Pioneer Electronic Corporation, Tokyo; Pioneer Communication Corp., Saitama, both of Japan

[21] Appl. No.: 875,416

[22] Filed: Apr. 29, 1992

[30] Foreign Application Priority Data

May 20, 1991 [JP] Japan .................................. 3-114513

[51] Int. Cl.⁵ .......................................... H04M 11/00
[52] U.S. Cl. ..................................... 379/61; 455/33.1; 455/54.1
[58] Field of Search .................. 379/56, 58, 59, 60, 379/61, 201, 210, 211, 212; 455/31.1, 33.1, 33.2, 39, 49.1, 53.1, 54.1, 73, 78

[56] References Cited

U.S. PATENT DOCUMENTS

| | | | |
|---|---|---|---|
| 3,644,681 | 2/1972 | Rice | 379/61 |
| 4,112,257 | 9/1978 | Frost | 379/58 |
| 4,939,785 | 7/1990 | Murata et al. | 455/54.1 |

FOREIGN PATENT DOCUMENTS

| | | | |
|---|---|---|---|
| 0024526 | 1/1989 | Japan | 455/33.1 |
| 0101427 | 4/1991 | Japan | 455/33.1 |
| 0131132 | 6/1991 | Japan | 455/33.1 |

*Primary Examiner*—Jin F. Ng
*Assistant Examiner*—William D. Cumming
*Attorney, Agent, or Firm*—Sughrue, Mion, Zinn, Macpeak & Seas

[57] ABSTRACT

A portable-to-portable talk system for cordless telephone. The transmitter-receiver of base unit has a control channel and a plurality of talk channels. The transmitter-receiver transmits the channel number of a vacant talk channel to a first portable unit and to a second portable unit over the control channel upon reception of a connection request from the first portable unit over the control channel. The transmitter-receiver is then switched from the control channel to the vacant talk channel after having transmitted the channel number of vacant talk channel over the control channel. Then, the receiver output of the transmitter-receiver is connected to the transmitter input. The transmitter-receiver of the portable unit has the control channel and the plurality of talk channels and transmits the connection request to the base unit over the control channel. The transmitter-receiver of portable unit is switched from the control channel to the vacant talk channel upon reception of the channel number of vacant talk channel from the base unit. A Tx/Rx selecting signal is transmitted over the vacant talk channel to other portable unit via the base unit when an operator of portable unit completes his speech. The second transmitter-receiver operates as a receiver when the Tx/Rx selecting signal is outputted from the local portable unit, and as a transmitter upon reception of the Tx/Rx selecting signal from other portable unit so that an operator is permitted to begin his speech.

1 Claim, 3 Drawing Sheets

PORTABLE-TO-PORTABLE TALK SYSTEM FOR CORDLESS TELEPHONE

BACKGROUND OF THE INVENTION

1. Field of the Invention

The present invention relates to a portable-to-portable talk system for cordless telephone where a base unit and portable units are linked over a radio channel.

2. Prior Art

A conventional base unit of cordless telephone has two transmitter-receivers, each of which having a radio channel different from the other. A first transmitter-receiver is used to establish a talk channel between a first portable unit while the other is used to provide a talk channel between a second portable unit. The receiver output of the first transmitter-receiver is connected with the transmitter input of the second transmitter-receiver so as to set up a portable-to-portable talk channel via the base unit. The provision of two transmitter-receivers in the base unit increases the complexity of overall configuration of the system and manufacturing costs. Moreover, two talk channels may not always be available depending on the degree of congestion of the line, in which case a portable-to-portable talk channel cannot be set up.

SUMMARY OF THE INVENTION

An object of the invention is to provide a portable-to-portable talk system for cordless telephone where a single channel is used to provide a talk channel between two portable units in such a way that an operator of one portable unit listens when an operator of the other portable unit speaks.

Another object of the invention is to provide an improved portable-to-portable talk system of cordless telephone where the configuration of base unit is simplified for effective use of radio channels.

The transmitter-receiver of base unit has a control channel and a plurality of talk channels. The transmitter-receiver transmits the channel number of a vacant talk channel to a first portable unit and to a second portable unit over the control channel upon reception of a connection request from the first portable unit over the control channel. The transmitter-receiver of base unit is then switched from the control channel to the vacant talk channel after having transmitted the channel number of vacant talk channel over the control channel. Then, the receiver output of the transmitter-receiver is connected to the transmitter input.

The transmitter-receiver of the portable unit has the control channel and the plurality of talk channels and transmits the connection request to the base unit over the control channel. The transmitter-receiver of portable unit is switched from the control channel to the vacant talk channel upon reception of the channel number of the vacant talk channel from the base unit. A Tx/Rx selecting signal is transmitted over the vacant talk channel to other portable unit via the base unit when an operator of the portable unit completes his speech. The transmitter-receiver operates as a receiver when the Tx/Rx selecting signal is outputted from the local portable unit, and operates as a transmitter upon reception of the Tx/Rx selecting signal from other portable unit via the base unit so that an operator is permitted to begin his speech.

BRIEF DESCRIPTION OF THE DRAWINGS

Features and other objects of the invention will be more apparent from the detailed description of the preferred embodiments with reference to the accompanying drawings in which.

DESCRIPTION OF THE PREFERRED EMBODIMENTS

Embodiment

An embodiment of the invention will now be described in detail with reference to FIGS. 1A and 1B.

Figure 1A:
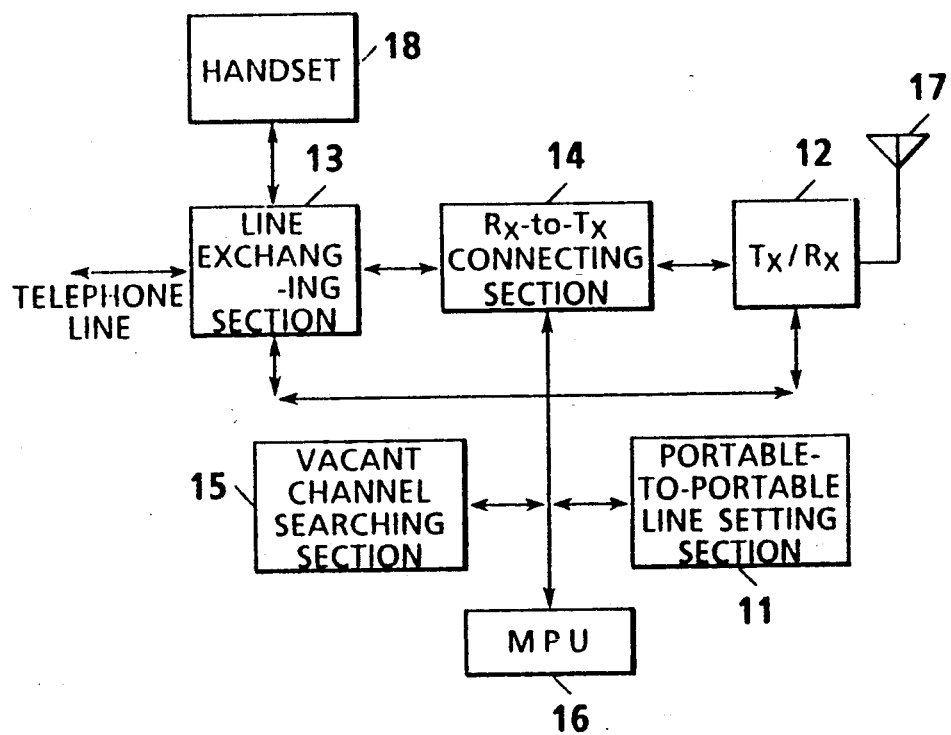
FIG. 1A shows an embodiment of a base unit of a portable-to-portable talk system of cordless telephone according to the invention.

FIG. 1A shows an embodiment of a base unit according to the present invention. In the figure, a portable-to-portable line setting section 11 takes the form of, for example, a program showing the procedure for setting up a portable-to-portable talk channel. Under control of this program, a microprocessor(MPU) 16 performs signal processing necessary for setting up a talk channel between the base unit and a portable unit.

The microprocessor 16 outputs a command to a vacant channel searching section 15 so that the vacant channel searching section 15 searches a plurality of talk channels, which are preassigned for base-to-portable talk, for a vacant talk channel. Thus, a talk channel is established between the base unit and the portable unit via the transmitter-receiver 12.

The transmitter output of transmitter-receiver 12 is radiated through an antenna 17. A line exchanging section 13 connects the handset 18 to an external telephone line during normal telephone call, and connects the handset 18 to a Rx-to-Tx connecting section 14 when a talk channel is to be established between the base unit and a portable unit. The Rx-to-Tx connecting section 14 is responsive to a portable-unit calling signal from a portable unit to connect the receiver output to the transmitter input so as provide a portable-to-portable talk channel.

Figure 1B:
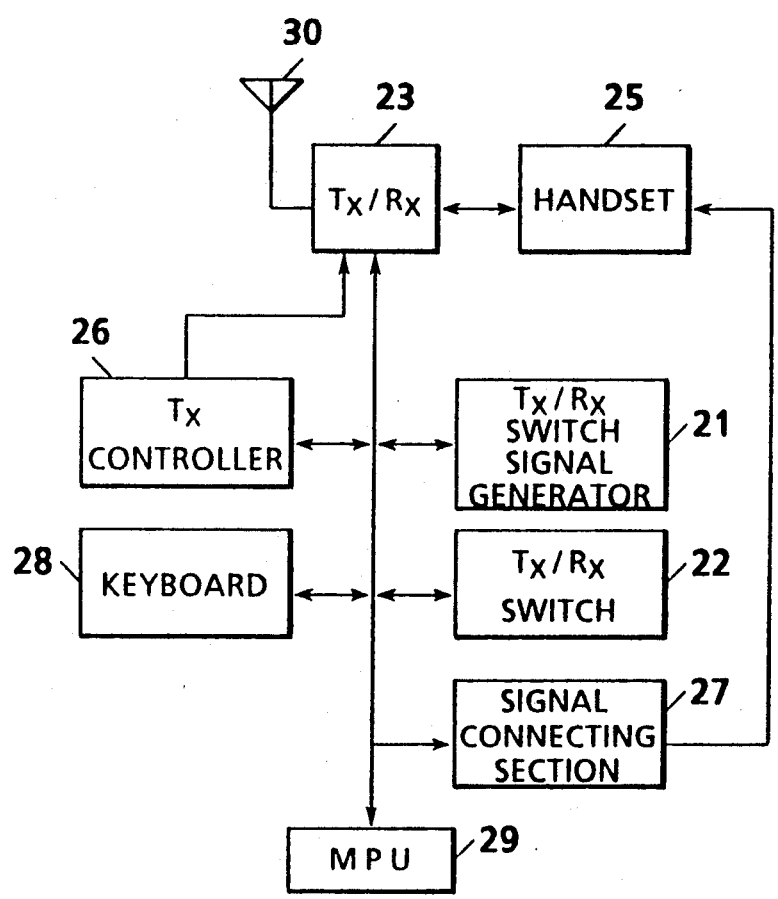
FIG. 1B shows an embodiment of a portable unit of the invention.
Figure 2:
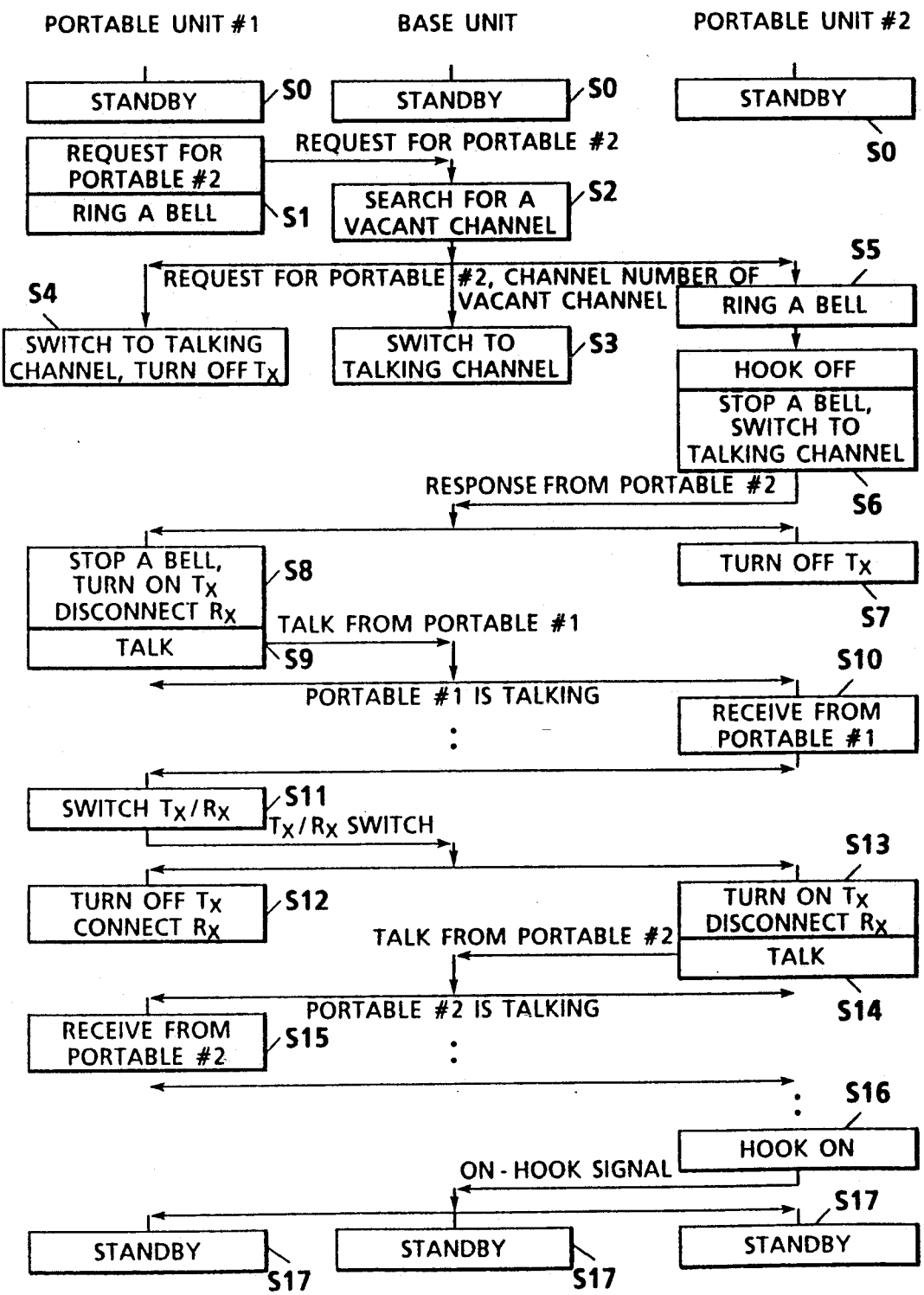
FIG. 2 is a flowchart illustrating the operation of the base unit and portable unit of the present invention.

FIG. 1B shows an embodiment of a portable unit according to the present invention. In the figure, a keyboard 28 has ten keys corresponding to 0 to 9 for generating dial pulses and function keys such as "*" and "#." A Tx/Rx selector 22 takes the form of, for example, a program which determines the procedure for setting up a portable-to-portable talk channel. Under control of the Tx/Rx selector 22, a microprocessor(MPU) 29 performs signal processing necessary for setting up a talk channel between the base unit as well as for switching the transmitter-receiver 23 between a transmitter mode and a receiver mode.

The radio transmitter-receiver 23 transmits various signals to the base unit through an antenna 30 and receives the radio wave from the base unit. A Tx controller 26 controls the transmitter-receiver 23 to transmit a radio wave during the talking mode and to stop transmission of radio wave during the listening mode. A signal connecting section 27 connects the receiver output of transmitter-receiver 23 to a handset 25 during the listening mode and disconnects the receiver output from the handset 25 during the talking mode. When the operator of the portable unit 1 completes talking and presses a Tx/Rx selection key, not shown, on the keyboard 28, a Tx/Rx selecting signal generator 21 outputs to the transmitter-receiver 23 a Tx/Rx selecting signal indicating that the transmission of a message from the portable unit 1 has completed. The handset 25 includes a microphone and an earphone. The operator inputs his speech toward the microphone and listens to the speech from the other portable unit through the earphone.

Operation of the System

The operation of the invention will now be described with reference to a flowchart in FIG. 3. In this embodiment, it is assumed that the operator of portable unit 1 calls the operator of portable unit 2.

STEP 0: The transmitter-receivers of the base unit, the portable unit 1, and portable unit 2 are all in standby condition on a control channel.

STEP 1: The operator of portable unit 1 operates a key, not shown, on the keyboard 28 to request a connection from the portable unit 1 to the portable unit 2. The MPU 29 of the portable unit 1 outputs a unit-#2-calling signal to the base unit over the control channel of transmitter-receiver 23 while also causing the local bell to ring so that the operator knows the portable unit 2 is being called.

STEP 2: The base unit receives the unit-#2-calling signal from the portable unit 1. The vacant channel searching section 15 searches radio waves incoming through antenna for a talk channel currently not used. Then, the vacant channel searching section 15 transmits the channel number of thus searched vacant talk channel and the unit-#2-calling signal over the control channel. The control channel is received by both the portable unit 1 and portable unit 2.

STEP 3: When the base unit has completed the transmission of the channel number of vacant talk channel and the unit-#2-calling signal at step 2, the microprocessor 16 sets the transmitter-receiver 12 for the vacant channel and the Rx-to-Tx connecting section 14 connects the receiver output of transmitter-receiver 12 to the transmitter input.

STEP 4: When the portable unit 1 receives the channel number of vacant talk channel and the unit-#2-calling signal from the base unit at step 2, the MPU 29-1 of unit 1 sets the transmitter-receiver 23-1 for the talk channel while also sending a command to the Tx controller 26-1 which causes the transmitter-receiver 12-1 to stop the transmission of radio wave and to operate as a receiver or in listening mode.

STEP 5: When the portable unit 2 reveices the channel number of vacant talk channel and the unit-#2-calling signal from the base unit at step 2, the local bell of unit 2, not shown, rings to inform the operator that the portable unit 2 is being called.

STEP 6: When the operator of portable unit 2 picks up the handset 25-2, the bell stops ringing and the MPU 29-2 causes the transmitter-receiver 23-2 to be set for the talk channel so as to transmit a response-from-portable-unit over the talk channel. The response-from-portable-unit is received by the base unit and is further transmitted from the base unit over the talk channel. Thus, this transmission of response-from-portable-unit from the base unit is received by both the portable unit 1 and the portable unit 2.

STEP 7: When the portable unit 2 receives the radio wave from the base unit and detects the response-from-portable-unit, the microprocessor 29-2 of portable unit 2 outputs a command to the Tx controller 26-2 to stop transmission of a radio wave.

STEP 8: When the portable unit 1 receives the radio wave from the base unit and detects the response-from-portable-unit, the bell of portable unit 1 stops ringing and the microprocessor 29-1 outputs a command to the Tx controller 26-1 to enable transmission of radio wave. The signal connecting section 27-1 disconnects the receiver output from the earphone of handset 25-1 to enter a talking mode. The operator of portable unit 1 speaks toward the microphone of handset. The speech is transmitted through the transmitter-receiver 23-1 and is relayed by the base unit, so that both the portable units 1 and 2 receive the speech. However, the operator of portable unit 1 cannot hear his own speech since the receiver output of portable unit 1 has been disconnected from the earphone of handset at step 8. Thus, no caller's echo is encountered.

STEP 10: This speech from the portable unit 1 is relayed by the base unit and is transferred to the portable unit 2 so that the operator of unit 2 can hear the speech from the earphone of his handset.

STEP 11: When the operator of portable unit 1 has completed his speech and presses the TX/Rx selection key, not shown, on the keyboard 28, the Tx/Rx selecting signal generator 21 outputs the Tx/Rx selecting signal to the transmitter-receiver 23-1.

STEP 12: The base unit receives the Tx/Rx selecting signal from the portable unit 1 and further transmits the same Tx/Rx selecting signal through the antenna 17. This radio wave is received by both the portable unit 1 and portable unit 2. Upon reception of this Tx/Rx selecting signal, the microprocessor 29-1 of portable unit 1 outputs a command to the Tx controller 26-1 to stop transmission of a radio wave to enter a listening mode.

STEP 13: When the portable unit 2 receives the Tx/Rx selecting signal, the Tx controller 26-4 activates the transmitter-receiver 23-2 and the signal connecting section 27-1 disconnects the receiver output of transmitter-receiver from the earphone of handset 25-2 to enter a talking mode.

STEP 14: The operator of portable unit 2 speaks toward the microphone of handset 25-2.

STEP 15: The portable unit 1 receives the speech from the portable unit 2 via the base unit so that the operator of the portable unit 1 can hear the speech through the handset.

STEP 16: When the call between the portable unit 1 and portable unit 2 has completed and both the operators hang up their handsets, hook switches of the respective portable units, not shown, enter on-hook condition. The portable unit, whichever is the last unit to transmit a message, sends out an on-hook signal.

STEP 17: The base unit receives and then transmits the on-hook signal to both the portable unit 1 and portable unit 2 and then returns to standby condition. The portable units 1 and 2 receive the on-hook signal from the base unit and then return to a standby condition.

What is claimed is:

1. A portable-to-portable talk system for cordless telephone where a base unit and portable units are linked via a radio transmitter-receiver, said base unit comprising:
   a first transmitter-receiver having a control channel and a plurality of talk channels;
   a portable-to-portable line setting section for causing said first transmitter-receiver to transmit a channel number of a vacant talk channel selected from said plurality of talk channels to a first portable unit and to a second portable unit over said control channel upon reception of a connection request from said first portable unit over said control channel, said portable-to-portable line setting section causing said first transmitter-receiver to switch from said control channel to said vacant talk channel after said channel number of vacant talk channel is transmitted from said first transmitter-receiver over said control channel, said portable-to-portable line setting section connecting a receiver output of said first transmitter-receiver to a transmitter input of said first transmitter-receiver after said channel number of vacant talk channel is transmitted to said first and second portable units;

each of said plurality of portable units comprising:

a second transmitter-receiver having said control channel and said plurality of talk channels, said second transmitter-receiver transmitting said connection request to said base unit over said control channel when requesting a connection to other portable unit, said second transmitter-receiver being switched from said control channel to said vacant talk channel upon reception of said channel number of vacant talk channel from said base unit over said control channel;

A Tx/Rx selecting signal generator for generating a signal commanding a switching of said second transmitter-receiver between Tx mode and Rx, said Tx/Rx selecting signal being transmitted over said vacant talk channel to other portable unit via said base unit when an operator of portable unit completes his speech;

a Tx/Rx selector for causing said second transmitter-receiver to operate as a receiver when said TX/Rx selecting signal is outputted from said Tx/Rx selecting signal generator, said Tx/Rx selector causing said second transmitter-receiver to operate as a transmitter upon reception of said Tx/Rx selecting signal from other portable unit via said base unit over said talk channel so that an operator is permitted to begin his speech.

* * * * *